(12) United States Patent
Ritz et al.

(10) Patent No.: US 7,949,904 B2
(45) Date of Patent: May 24, 2011

(54) SYSTEM AND METHOD FOR HARDWARE ERROR REPORTING AND RECOVERY

(75) Inventors: Andrew J Ritz, Sammamish, WA (US); John A Strange, San Isabel, CO (US)

(73) Assignee: Microsoft Corporation, Redmond, WA (US)

( * ) Notice: Subject to any disclaimer, the term of this patent is extended or adjusted under 35 U.S.C. 154(b) by 746 days.

(21) Appl. No.: 11/121,857

(22) Filed: May 4, 2005

(65) Prior Publication Data

US 2006/0253740 A1 Nov. 9, 2006

(51) Int. Cl.
*G06F 11/00* (2006.01)
(52) U.S. Cl. .......................................................... 714/48
(58) Field of Classification Search ...................... 714/48
See application file for complete search history.

(56) References Cited

U.S. PATENT DOCUMENTS

2003/0126516 A1* 7/2003 Komarla et al. ................. 714/45
2006/0143515 A1* 6/2006 Kuramkote et al. ............ 714/15

* cited by examiner

*Primary Examiner* — Scott T Baderman
*Assistant Examiner* — Jigar Patel
(74) *Attorney, Agent, or Firm* — Wolf, Greenfield & Sacks, P.C.

(57) ABSTRACT

A system and method for hardware error reporting and recovery is presented. An operating system provides an error signal handler, a platform-independent error processing module, and a platform-specific error handler. The error signal handler is configured to detect the occurrence of a hardware error and to notify the platform-independent error processing module of the detected hardware error. The platform-independent error processing module is configured to process the hardware error detected by the error signal handler. The platform-specific error handler is configured to perform platform-specific error processing of the hardware error in cooperation with the platform-independent error processing module.

18 Claims, 5 Drawing Sheets

SYSTEM AND METHOD FOR HARDWARE ERROR REPORTING AND RECOVERY

FIELD OF THE INVENTION

The present invention relates to computer hardware error reporting, and more particularly relates to a system and method for hardware error reporting and recovery, suitable for implementation on a plurality of computer hardware platforms.

BACKGROUND OF THE INVENTION

When a computer system fails, it is often very difficult to determine the exact cause of the failure. As those skilled in the art will appreciate, both the software and hardware components of a computer system can fail, though typically hardware components are not the initial suspect as they are expected to operate for long periods of time without any failures. Nevertheless, hardware components do occasionally fail.

On most computer systems, hardware components implement basic error reporting measures, including writing error codes into component-related registers or memory locations, or signaling the computer system, particularly the operating system, that a hardware error has occurred. Upon notification of the error, the computer system, particularly some portion of the operating system, takes some sort of responsive action. Depending on the nature of the hardware error, any of a variety of actions may be in order. For example, if the error was corrected by the system, such as by hardware logic that corrects simple memory bit errors, no immediate action need be taken. If the error represents an uncorrectable but localized issue, the computer system may respond by isolating the problem and avoiding its use. "Sparing out" a range of faulty memory locations, i.e., setting aside the faulty range as unavailable memory, is one example of isolating a localized problem, without actually "fixing" the faulty component (memory). On the other hand, if the hardware error is a catastrophic failure of a fundamental component, and/or one in which continued operation runs the risk of data corruption or permanent computer system damage, the appropriate action may be to shut down or immediately halt operation, gracefully or otherwise. Of course, there are numerous other actions that may be taken, depending on the type of error condition and the abilities of the computer system to cope with any particular errors.

In spite of the error reporting capabilities of hardware components, most computer operating systems fail to make effective use of available/reported hardware error information. There are several reasons that operating systems fail to make better and more effective use of the error information. One reason is that operating systems are frequently designed to operate over a wide variety of hardware platforms, including widely differing processor architectures. Unfortunately, virtually every hardware platform reports hardware errors in its unique manner. As such, an operating system's hardware error handling module must be tailored to a specific hardware platform. An operating system's hardware error handling module (or modules) may be further specialized to a particular hardware platform because this module or handler, as part of the operating system, operates entirely within the protected kernel mode of the operating system. As those skilled in the art will appreciate, updating the hardware error module after the operating system is installed is simply impractical.

Yet another reason why operating systems fail to make effective use of the available/reported hardware error information is that while a group of computer systems may have a common processor type, each "similar" computer system may surround the processor with differing supporting chip sets, and these chip sets frequently play a major role in reporting hardware errors. Similarly, computer system firmware and BIOS implementations also vary across similar systems, and may also play an important role in reporting hardware errors. Thus, while two computer systems appear to be the same, error handling modules may require that they be specifically tailored to a specific combination of processor, supporting chip set, and/or BIOS.

Still another reason why operating systems fail to make effective use of the available/reported hardware error information, even when such information is standardized, is that an operating system provider simply targets only that information which represents the "least common denominator" of information between platforms. That is, only hardware error information that is common across a variety of platforms is utilized. Unfortunately, by acting on the "least common denominator" of hardware error information, such actions are substantially inferior to those actions that might be taken if richer error information was available.

Due to the specific nature of hardware error reporting and the difficulty in tailoring more specific error handing to the numerous permutations of computer system architectures, current operating systems provide only the most generic hardware error handling modules. As a result, even though a substantial amount of hardware error information may be reported and/or available, it is largely underutilized, even to the point that some hardware errors may not be discovered, acted upon, or reported.

In light of the above issues with regard to hardware error reporting and recovery, what is needed is improved hardware error reporting and recovery capability integrated within an operating system. This improved hardware error reporting and recovery capability should allow the operating system to fully utilize the hardware error reporting and recovery capabilities of the underlying hardware platform. Improved hardware error reporting and recovery capability should allow the operating system to generate error records which describe error conditions in sufficient detail as to allow human and software agents to identify the root cause of a given error condition and the hardware component(s) to which the error condition is attributed. The error record should be encoded such that it is generally applicable to all possible hardware error conditions, enabling human and software agents to process the error record in a generic fashion across all permutations of hardware components and hardware platform configurations. Additionally, the improved hardware error reporting and recovery capability should provide both generic hardware handler components, which can be easily ported across a variety of processor architecture platforms, as well as platform-specific components that are tailored to a specific computer system, and which can be easily updated, extended, and improved without requiring difficult operating system modification. The present invention addresses these and other issues found in the prior art.

SUMMARY OF THE INVENTION

According to aspects of the present invention, an operating system executable on a computer system having a plurality of hardware components, configured for handling hardware errors from a hardware component, is presented. The operating system includes an error signal handler, a platform-independent error processing module, and a platform-specific error handler. The error signal handler is configured to detect the occurrence of a hardware error and notifies the platform-independent error processing module of the detected hardware error. The platform-independent error processing module is configured to process the hardware error detected by the error signal handler. The platform-specific error handler is configured to perform platform-specific error processing of the hardware error in cooperation with the platform-independent error processing module.

In accordance with additional aspects of the present invention, a computer-readable medium bearing computer-executable instructions which, when executed on a computer system having a plurality of hardware components, carry out a method for processing a hardware error received from a hardware component on the computer system, is presented. The method comprises, at a platform-independent error processing module, receiving notice of a hardware error. Thereafter, an error record, corresponding to the hardware error based on error information available to the platform-independent error processing module, is generated. A platform-specific error handler module is then requested to augment the error record with additional error information available to the platform-specific error handler module that is not available to the platform-independent error processing module.

In accordance with yet further aspects of the present invention, a method for processing a hardware error received from a hardware component on the computer system is presented. The method comprises, at a platform-independent error processing module, receiving notice of a hardware error from an error signal handler module that detects hardware errors from one or more hardware components. Thereafter, an error record corresponding to the hardware error based on error information available to the platform-independent error processing module is generated. A platform-specific error handler module is requested to augment the error record with additional error information available to the platform-specific error handler module that is not available to the platform-independent error processing module. The platform-specific error handler module is also requested to persist the error record in a persistent storage area associated with the computer system.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
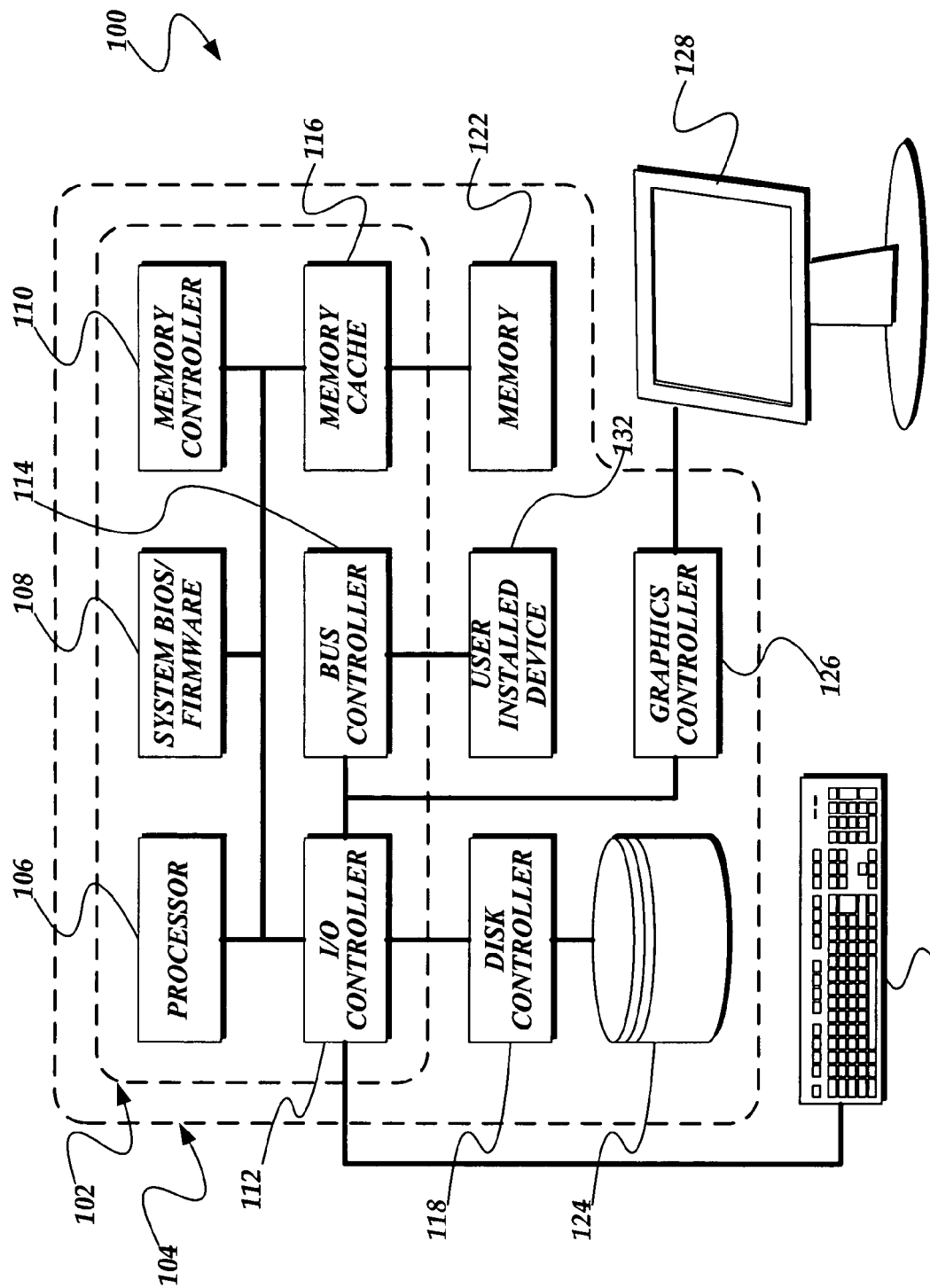
FIG. 1 is a block diagram illustrating exemplary components of a typical computer system on which the present invention may be implemented.

As indicated above, FIG. 1 is a block diagram illustrating exemplary components of a typical computer system 100 upon which the present invention may be implemented. The exemplary computing system 100 includes a processor 106, system BIOS/firmware 108, a memory controller 110, an I/O controller 112, a bus controller 114, and a memory cache 116. These components, enclosed by box 102, typically represent a computer system's base components, and are typically delivered as an integrated whole by a computer system provider.

In addition to the base components 102, the exemplary computer system 100 also includes a memory 122, a disc controller 118, a hard disc 124, a graphics controller 126, and user installed devices, such as user installed device 120. These components, as denoted by box 104, are typically included within the computer system's housing along with the base components 102. Additionally, as those skilled in the art will appreciate, computer systems frequently also include components external to the computer housing, including so-called peripheral devices, such as a keyboard 130, a mouse (not shown), and a graphics display monitor 128.

Hardware error reporting varies between components. For example, memory errors are almost always reported to the system, usually by the memory controller 110 that includes logic to monitor for error conditions. Alternatively, a keyboard or mouse error may go entirely unreported to the operating system. Indeed, hardware errors that occur among the base components are usually most likely to be reported, though hardware errors that occur within the computer housing, i.e., internal components 104, are also frequently reported. Thus, while the present invention of error reporting and recovery may be implemented on any particular level of hardware device or component, i.e., base components, internal components, or all components including peripherals, according to one embodiment, the present application is directed at hardware error reporting and recovery of base system components 102.

While FIG. 1 illustrates components typically found on a personal computer, it should be appreciated that a typical personal computer likely includes numerous other hardware components that are not shown, all of which may report hardware errors to the computer system. As such, the above description of hardware components should be viewed as illustrative only, and not construed as limiting upon the present invention.

Similarly, the present invention may be implemented on a variety of computing devices that may or may not include all of the components identified above. These additional computing devices include, but are not limited to, personal digital assistants (PDAs), notebook computers, tablet computers, and mini- and main frame computers, as well as other non-traditional computing devices such as hybrid telephone/PDA combinations. Accordingly, while the subsequent discussion of the present invention will be directed to the exemplary computing system shown in FIG. 1, such references should be viewed as illustrative only, and not construed as limiting upon the present invention.

Figure 2:
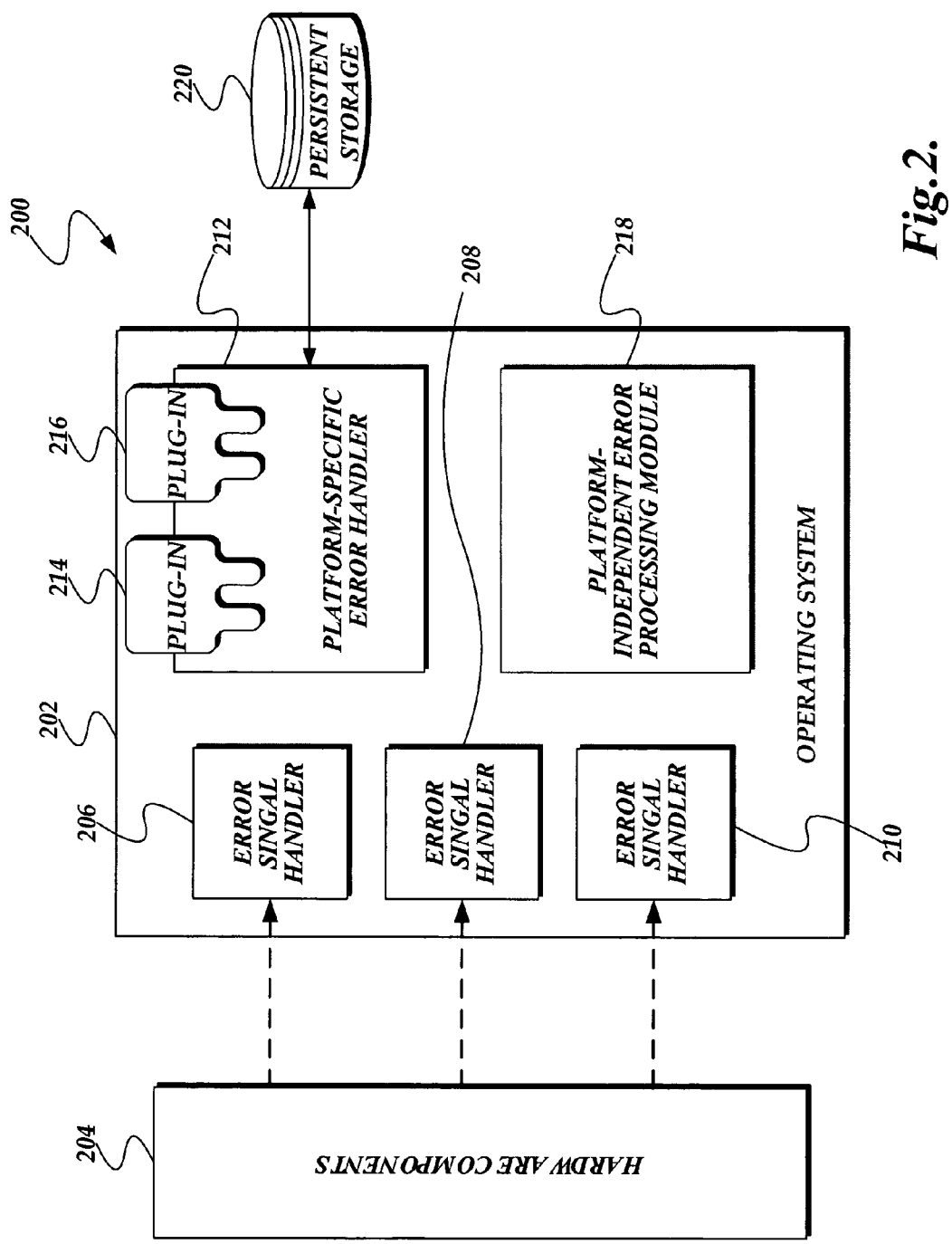
FIG. 2 is a block diagram illustrating exemplary components of an operating system configured to implement generic hardware error reporting and recovery across multiple hardware platforms.

FIG. 2 is a block diagram illustrating exemplary components of an operating system 202 configured to implement generic hardware error reporting and recovery such that it may be implemented across a plurality of hardware platforms. As will be discussed in further detail below, the operating system 202 includes both generic and platform-specific error processing components. Furthermore, it should be noted that the exemplary operating system 202 shown in FIG. 2 identifies only certain components related to reporting and recovering from hardware component errors. Of course, those skilled in the art will readily appreciate that an operating system includes numerous components that are not illustrated in FIG. 2. Accordingly, the description of the operating system components of FIG. 2 should be viewed as illustrative only, and not construed as limiting upon the present invention.

According to aspects of the present invention, the operating system 202 includes one or more error signal handlers, such as error signal handlers 206-210, configured to be responsive to hardware error notifications from hardware components 204. Error signal handlers may operate as handlers for asynchronous hardware generated interrupts, as a polling routine which periodically reads hardware error reporting locations for extant errors, or as routines configured to be called by system firmware in the presence of hardware error conditions. According to one embodiment, an error signal handler is configured to monitor for, and/or be responsive to, a particular type of error notification from a hardware component. For example, error signal handler 206 may be configured to detect and respond to non-maskable interrupts, error signal handler 208 may be configured to detect and respond to hardware exceptions, and error signal handler 208 may be configured to detect and respond to hardware errors written to particular memory locations. While, in one embodiment, error signal handlers are written to detect and/or be responsive to one particular type of hardware error notification, in an alternative embodiment, a single error signal handler may detect and/or be responsive to numerous types of hardware error notifications.

While monitoring for and responding to various types of hardware error notifications tends to involve, to some degree, some platform-specific knowledge, the error signal handlers are, for the most part, generic. In particular, the manner in which error signal handlers are configured for operation, and the mechanisms they employ to extract hardware error information from their respective hardware devices, are described in a generic fashion by the hardware platform. As such, these error signal handlers are portable across a variety of hardware platform configurations.

In addition to error signal handlers, the exemplary operating system 202 also includes a error processing module 218. While the operation of the error processing module 218 is discussed in greater detail below in regard to FIGS. 3A and 3B, the error processing module generally drives the reporting and recovery of hardware errors. The error processing module 218, of itself, is platform-independent, but utilizes a platform-specific error handler 212 to perform platform-specific operations, such as obtaining platform-specific data regarding the hardware error, processing the hardware error data, performing hardware error recovery, and the like.

The platform-specific error handler 212 may also be configured to optionally accept one or more plug-in modules, such as plug-in modules 214 and 216. Plug-in modules may be supplied by a hardware vendor, a value added reseller, a third party support provider, and the like. The plug-in modules permit parties to optionally supply additional error hardware information and processing routines to the system, and in particular hardware component specific information and recovery processing for the particular hardware component. Plug-in modules are specific in nature and may target very specific functionality. Plug-in modules are dynamically loaded and configured by the platform-specific error handler and impose no dependencies on other functional aspects of the operating system. As such, they can be easily updated, replaced, and/or installed without modifying the operating system 202 generally.

Also shown in FIG. 2 is a persistent storage 220. The persistent storage is typically not part of the operating system 202, but used by the platform-specific error handler 212 to store one or more error records generated by the operating system in response to a hardware error.

Figure 3A:
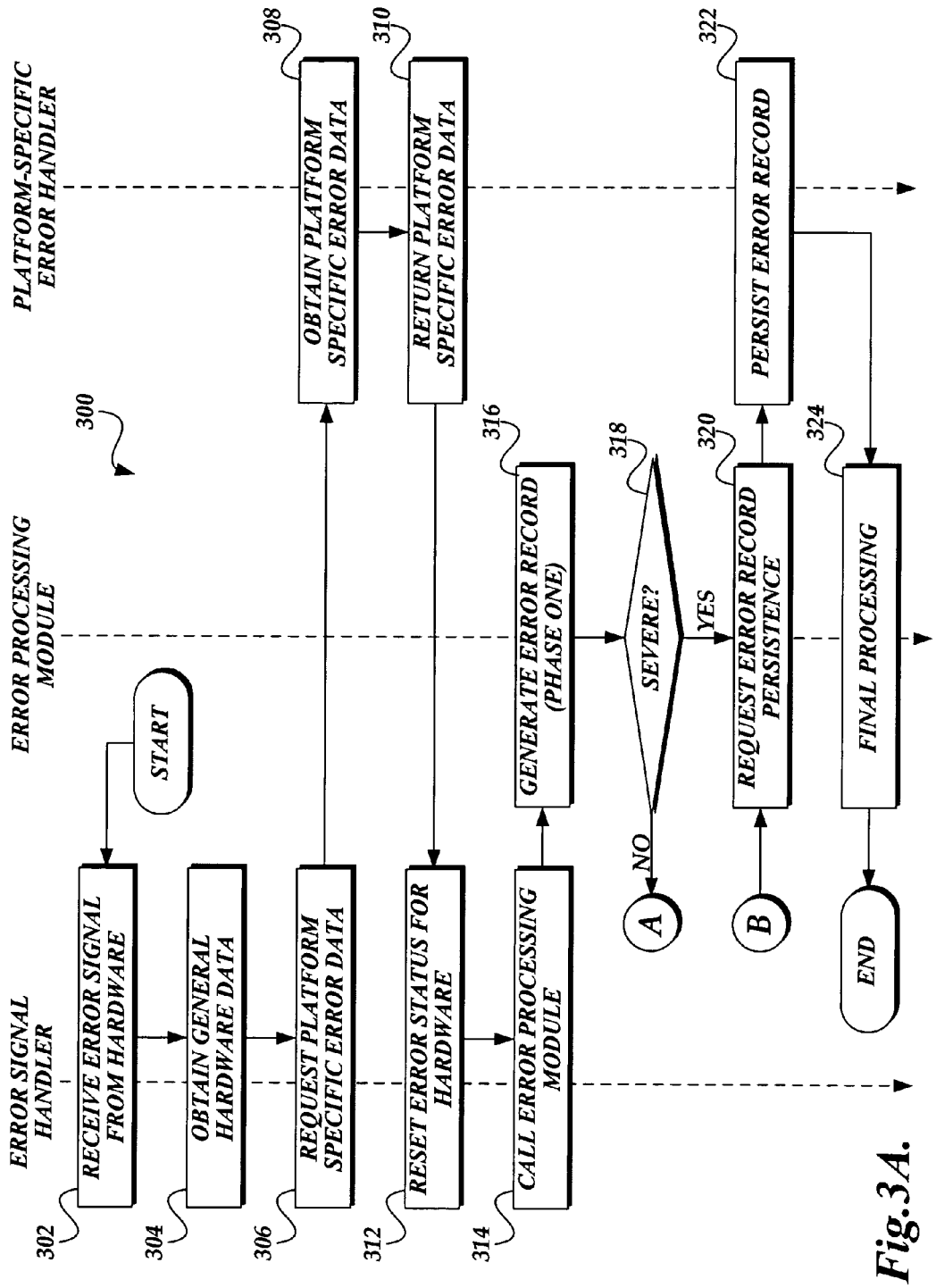
FIGS. 3A and 3B are an exemplary flow diagram illustrating the operation of the error reporting and recovery system of the present invention.
Figure 3B:
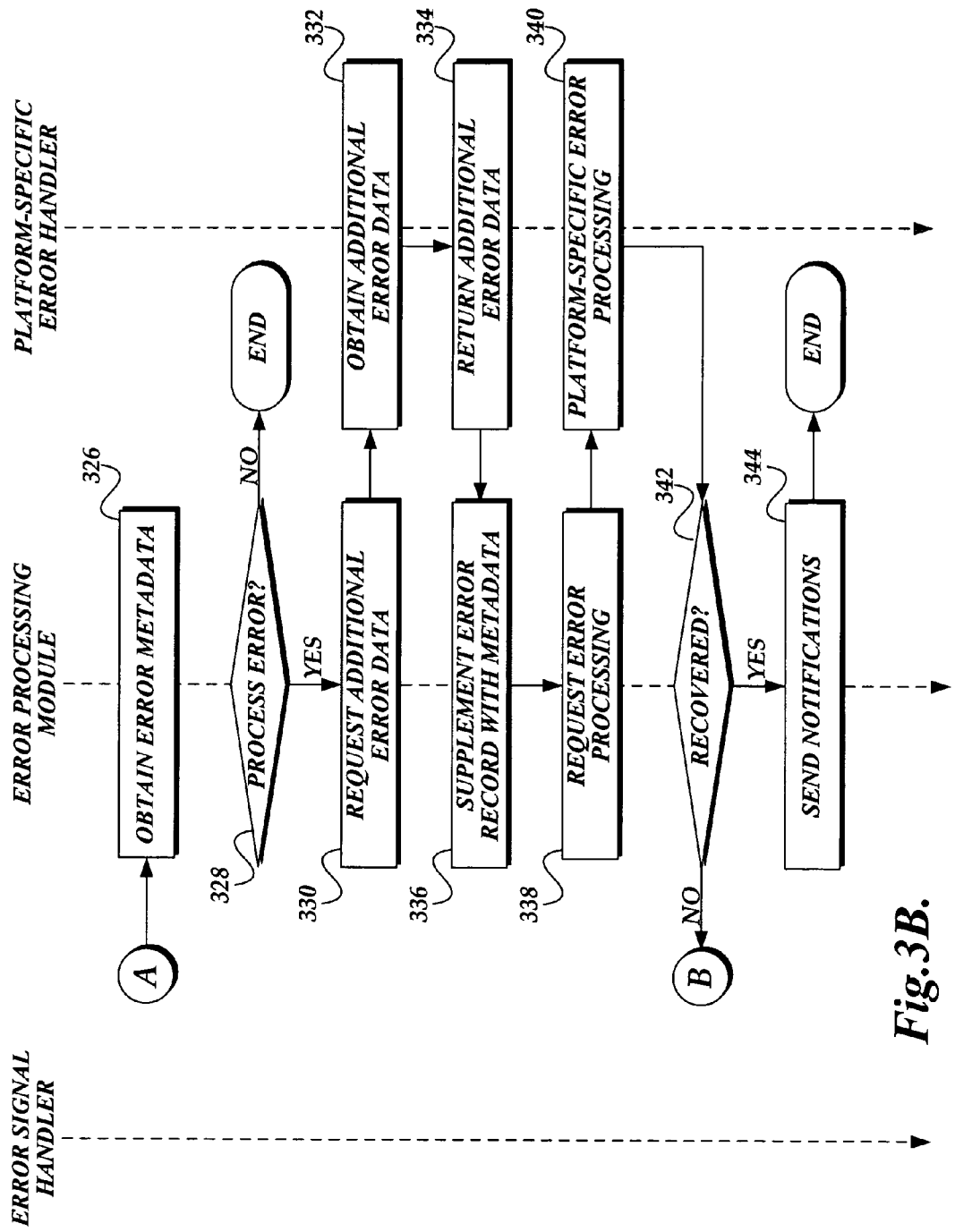

As indicated above, in order to better understand the various components in the exemplary operating system 202, their interaction with regard to receiving notification of an hardware error is described with regard to FIGS. 3A and 3B. In particular, FIGS. 3A and 3B are an exemplary flow diagram illustrating the operation of the operating system components, for reporting and recovering from hardware errors, as described in FIG. 2.

Beginning at block 302, an error signal handler receives notice of a hardware error from a hardware component. After receiving the hardware error signal notification, at block 304, the error signal handler 206 obtains any general hardware data regarding the hardware error. For instance, the error signal handler 206 may obtain information regarding the identity of particular hardware component, the type of error that occurred, and the like.

At block 306, the error signal handler 206 requests additional platform-specific error data from the platform-specific error handler 218. It should be appreciated that the request may ask for information regarding the hardware error, such as an error value and/or hardware component identity, so that the platform-specific error handler 218 can obtain the requested information. Correspondingly, at block 308, upon receiving the request from the error signal handler 206, the platform-specific error handler 218 obtains any additional platform-specific error data it has, or that any plug-in modules associated with the platform-specific error signal handler 218 may have, regarding the hardware error.

After obtaining additional platform-specific hardware error data, if any is available, at block 310, the platform-specific error handler 218 returns the additionally available platform-specific error data to the error signal handler 206. After having gathered both the generally available hardware error data and the platform-specific error data, at block 312, the error signal handler 206 resets the error status for the hardware component, if necessary. For example, as those skilled in the art will appreciate, it is frequently necessary to reset the error status of the hardware component in order for the computer system to continue to operate.

At block 314, the error signal handler 206 then calls, or transfers control to, the error processing module 218 for handling both generic and platform-specific error handling (including both reporting and/or recovery). Of course, the obtained hardware error data is either passed to the error processing module 218, or somehow made available to it, for example, via shared memory.

At block 316, the error processing module 218 generates an error record corresponding to the hardware error. This error record, commonly referred to as a phase I error record, includes the information that was already obtained by the error signal handler 206 and made available to the error processing module 218. At decision block 318, after generating the phase I error record, a determination is made as to the severity of the hardware error, i.e., whether the hardware error is one necessitating that the computer system shut down immediately. If the error is a severe error requiring that the computer system be shut down immediately, at block 320, the error processing module calls the platform-specific error handler 212 to persist the phase I error record. At block 322, the platform-specific error handler 212 persists the error record in an error record store (not shown) that is typically kept in nonvolatile memory. Clearly, one of the advantages of persisting the error record at this point is that when the computing system is brought back up, the computing system may be able to continue processing the hardware error, to at least report the problem or, alternatively, to take corrective measures to ensure that the problem does not occur again. After having persisted the phase I error record, at block 324, control is returned to the error processing module 218 for any final processing needed to shut the computer system down, and the exemplary routine 300 terminates.

At decision block 318, if the error is not determined to be a severe error, the routine proceeds to block 326 (FIG. 3B). At block 326, the error processing module 218 obtains error metadata it has regarding the error. Error metadata corresponds to information generally available to the error processing module regarding the hardware error, including user readable text regarding the error, possible options available to the computer user, and the like.

At decision block 328, a determination is made by the error processing module 218 as to whether it should process the hardware error or not. Processing the hardware error involves taking any necessary corrective actions, reporting the hardware error to the computer user, notifying error consuming applications associated with the error processing module 218, and the like. The determination to process the hardware error or not is made since some reported hardware errors do not require further processing. For example, frequently memory errors are automatically corrected by hardware logic, and as such, only when memory errors consistently occur within some range of memory should the errors be reported and/or further processed. Similarly, other circumstances may suggest that not every hardware error be reported or acted upon. Hence, at decision block 328, if no additional error processing is required, the routine 300 terminates.

Alternatively, if at block 330, additional error processing should be performed, the error processing module 218 requests additional error data from the platform-specific error handler 212. At block 332, the platform-specific error handler 212 obtains any additional error data regarding the detected hardware error that it may have, or that any installed plug-ins may have. After obtaining any additional error data, at block 334, the platform-specific handler 212 returns control back to the error processing module 218, along with any additional error data.

At block 336, the error processing module 218 supplements the phase I error record with the above-described metadata and any additional error data from the platform-specific error handler 212, thereby creating the phase II error record. After having constructed the phase II error record, at block 338, the error processing module 218 requests that the platform-specific error handler 212 process the error, as defined in the phase II error record.

At block 340, the platform-specific error handler 212 carries out any platform-specific error handling functions that are built into the platform-specific error handler. Furthermore, the platform-specific error handler 212 determines whether any plug-in modules also include additional error processing capabilities for the particular hardware error identified in the phase II error record. After having processed the hardware error at the platform-specific error handler 212, control returns again to the error processing module 218.

At decision block 342, a determination is made as to whether the computer system is now recovered from the hardware error (as a result of processing by the platform-specific error handler 212 and associated plug-ins). If the computer system is now recovered from the error, at block 344, the error processing module 218 optionally sends notices to any applications or services that may be consuming error messages on the computer system, whereupon the routine 300 terminates.

Alternatively, if the computer system is still not recovered from the hardware error, the routine 300 returns again to block 320 (FIG. 3A), where the error processing module 318 requests that the platform-specific error handler 212 persists/stores the phase II error record in persistent storage. At block 322, as described above, the platform-specific error handler 322 persists the phase II error record. Thereafter, control returns again to the error processing module 218. At block 324, any final processing involved with shutdown of the computer system is performed, whereupon the computer system, and routine 300, terminate.

In order to further enhance the platform-independent nature of the error processing module 218, as well as support the platform-specific information that may be available, the error record is constructed in a predetermined manner that include platform-independent data, and may also include platform-specific data. In other words, the error record is constructed such that it can be processed, at least at a basic level, across all hardware platforms. Consequently, tools implemented on any platform can be used to process hardware error records from any platform, which, of itself, is a step forward over the current systems.

Figure 4:
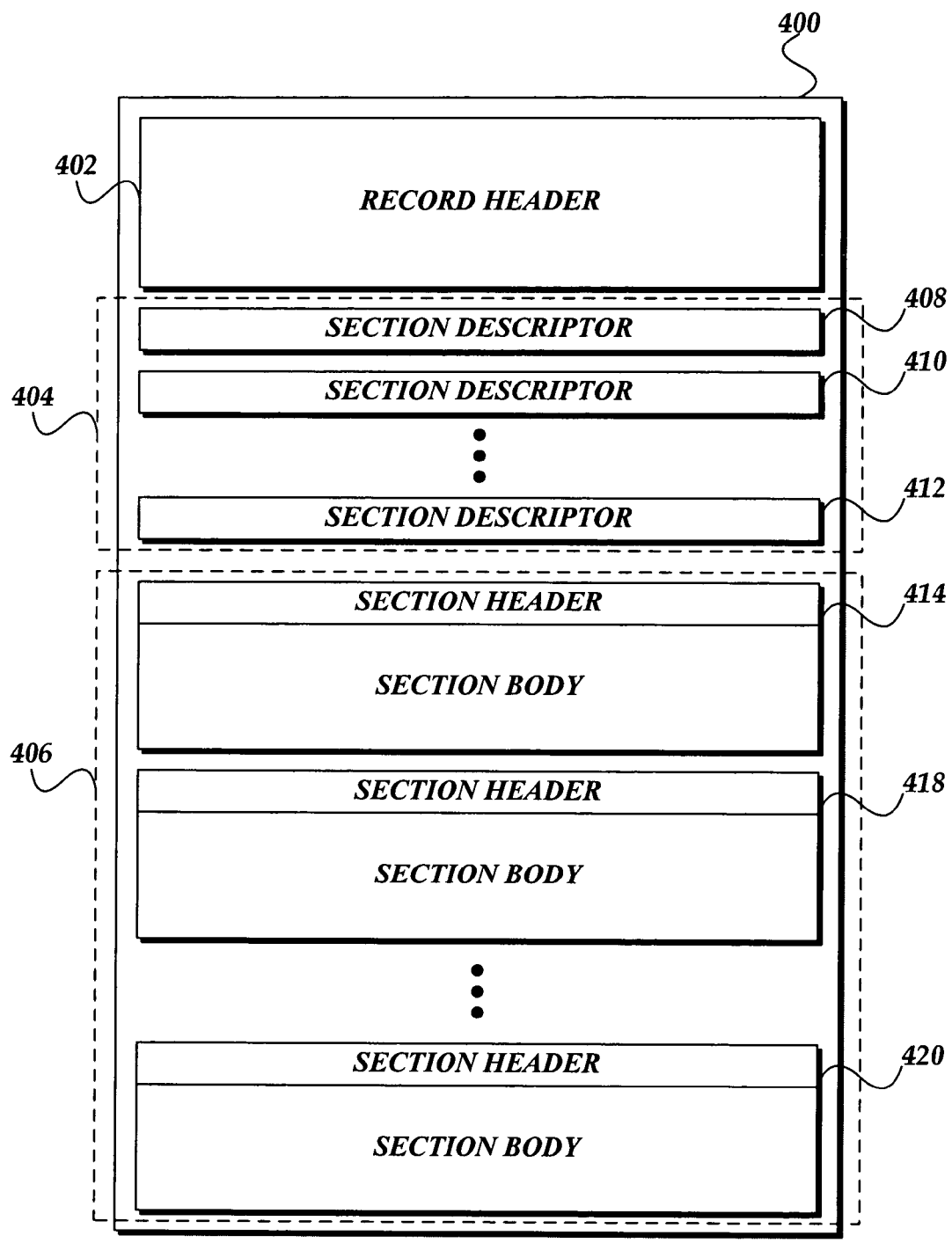
FIG. 4 is a block diagram illustrating components of an exemplary error record formed according to aspects of the present invention.

With regard to the error record structure, FIG. 4 is a block diagram illustrating the structure of an exemplary error record 400 formed according to aspects of the present invention. According to the present invention, each error record 400 includes a record header 402, and at least one section descriptor 408 and at least one corresponding section 410. As shown in FIG. 4, the error record 400 includes three section descriptors 408-412, and three corresponding sections 414-418. For each section descriptor in the error record, there is a corresponding section.

The record header 402 includes information that uniquely identifies the hardware error on a given system. This record header 402 information includes, but is not limited to, a major and minor version number for the error record identifying the structural elements to the record format, a unique error event identifier, the time that the hardware error was detected/reported, the severity of the hardware error (such as whether the error was corrected, or whether the error was fatal or non-fatal), and a count of the number of section descriptor/sections that are included in the error record 402.

Immediately following the record header 402 is an array 404 of section descriptors of the error record. Each section descriptor identifies the location and size of a corresponding section. The section descriptors are designed to facilitate the quick scanning of information in the error record, such that a software application can determine whether the contents of the corresponding section are interesting, whether the contents of the corresponding section can be interpreted/decoded by the software application, the location and size of the corresponding section. Section descriptors may also include flags indicating the type of hardware error that occurred, the severity of the hardware error, and information identifying a relationship with this section to other sections in the error record 402.

Following the section descriptors array 404 is a sections area 406. The sections area 406 includes one section for each section descriptor in the section descriptor array 404. Each section, such as section 410, includes both a section header and a section body. The section header includes information for locating various information in the section body, which follows immediately after the section header. More particularly, the section header includes flags that indicate what type of information is contained in the section body, as well as offsets for that information. These flags include one indicating whether standardized error hardware information is present in the section body, one indicating whether non-standardized hardware error information is present in the section body, and one indicating whether an ASCII description of the hardware component reporting the hardware error is present in the section header. In the case of the flags for standardized and non-standardized error information, if these flags are set to a "TRUE" value, the offset for that information, as found in section header, is valid and indicates the location of the information. In the case of the ASCII hardware component description, if the flag is set to true, the area in the section header that is set aside for this description contains valid information.

Standardized hardware error information contains predetermined error information depending on the type of error. This information includes error information that is consistent across a variety of hardware platforms, and typically will not include platform-specific error information. The actual structure of the standardized hardware error information depends on the type of hardware error that is reported. In contrast, the organization of non-standardized hardware error information is dictated by platform-specific components, such as the plug-in modules described above.

While various embodiments, including the preferred embodiment, of the invention have been illustrated and described, it will be appreciated that various changes can be made therein without departing from the spirit and scope of the invention.

The embodiments of the invention in which an exclusive property or privilege is claimed are defined as follows:

1. A computer system having a plurality of hardware components and an operating system that is configured for handling hardware errors from a hardware component, the operating system comprising a platform-independent error processing module and a platform-specific error handler, wherein:
    the platform-independent error processing module is configured to:
        receive notice of a hardware error from an error signal handler module that detects hardware errors from one or more hardware components;
        generate an error record corresponding to the hardware error, wherein the error record comprises a record header and a plurality of sections, and wherein at least one first section of the error record includes platform-independent error information available to the platform-independent error processing module; and
        request that a platform-specific error handler module augment the error record with additional error information that is available to the platform-specific error handler module but not available to the platform-independent error processing module; and
    the platform-specific error handler is configured to:
        perform platform-specific error handling functions at the direction of the platform-independent error processing module, wherein the platform-specific error handling functions comprise error recovery processing;
        augment at least one second section of the error record with platform-specific error information that is available to the platform-specific error handler module but not available to the platform-independent error processing module, wherein a section header of the at least one second section includes a flag indicating that the at least one second section includes platform-specific error information; and
        accept at least one plug-in module that is configured to:
            obtain additional platform-specific error data specific to at least one hardware component;
            perform additional platform-specific error handling functions comprising additional error recovery processing for the at least one hardware component associated with the at least one plug-in module; and
            augment the error record with additional error information that is available to the at least one plug-in module but not available to the platform-specific error handler module or the platform-independent error processing module.

2. The computer system of claim 1, wherein the at least one plug-in module is not supplied as part of the operating system.

3. The computer system of claim 1, wherein the platform-specific error handler is configured to accept a plurality of plug-in modules.

4. The computer system of claim 1, wherein the platform-independent error processing module generates the error record corresponding to the detected hardware error based on information received from the error signal handler.

5. The computer system of claim 4, wherein the platform-specific error handler stores the error record in a persistent storage at the direction of the platform-independent error processing module.

6. The computer system of claim 5, wherein, upon generating the error record, the platform-independent error processing module determines the severity of the hardware error, and if sufficiently severe:
    directs the platform-specific error handler to store the error record in a persistent storage area; and
    causes the computer system to shut down.

7. The computer system of claim 4, wherein the error record further comprises a section descriptor for each section of the plurality of sections, the section descriptor comprising information identifying a location of the corresponding section in the error record.

8. The computer system of claim 7, wherein the section descriptor further comprises information identifying a type of a hardware error.

9. The computer system of claim 1, wherein the platform-independent error processing module notifies applications that consume hardware error messages.

10. A computer storage medium bearing computer-executable instructions which, when executed on a computer system having a plurality of hardware components, carry out a method for processing a hardware error of a hardware component on the computer system, the method comprising:
    at a platform-independent error processing module:
        receiving notice of a hardware error;
        generating an error record corresponding to the hardware error, wherein the error record comprises a record header and a plurality of sections, and wherein at least one first section of the error record includes platform-independent error information available to the platform-independent error processing module; and
        requesting that a platform-specific error handler module augment the error record with additional error information that is available to the platform-specific error handler module but not available to the platform-independent error processing module; and
    at the platform-specific error handler module:
        performing platform-specific error handling functions at the direction of the platform-independent error processing module, wherein the platform-specific error handling functions comprise error recovery processing;

augmenting at least one second section of the error record with platform-specific error information that is available to the platform-specific error handler module but not available to the platform-independent error processing module, wherein a section header of the at least one second section includes a flag indicating that the at least one second section includes platform-specific error information; and dynamically loading and configuring at least one plug-in module that is associated with at least one hardware component, the at least one software plug-in module being capable of obtaining error information specific to the at least one hardware component.

11. The computer storage medium of claim 10, wherein the method further comprises:
at the platform-independent error processing module:
requesting that the platform-specific error handler module persist the error record in a persistent storage area associated with the computer system.

12. The computer storage medium of claim 10, wherein the platform-independent error processing module receives notice of the hardware error from an error signal handler module that detects hardware errors from one or more hardware components.

13. The computer storage medium of claim 10, wherein the method further comprises:
at the platform-specific error handler module:
requesting that the plug-in module further augment the error record with additional error information that is available to the plug-in module but not available to the platform-specific error handler module or the platform-independent error processing module.

14. The computer storage medium of claim 10, wherein the method further comprises:
at the platform-independent error processing module, upon generating an error record corresponding to the hardware error based on error information available to the platform-independent error processing module:
determining whether the severity of the hardware error is such that the computer system should be shut down, and if so:
requesting that the platform-specific error handler module persist the error record in a persistent storage area associated with the computer system; and
shutting down the computer system.

15. The computer storage medium of claim 13, wherein the method further comprises:
at the platform-independent error processing module:
sending notification of the hardware error and the error record to an application that consumes hardware error messages.

16. The computer-storage medium of claim 10, wherein:
the error record further comprises a plurality of section descriptors, each section descriptor of the plurality of section descriptors corresponding to a section of the plurality of sections;
each section descriptor comprises information identifying a location of a corresponding section in the error record;
each section descriptor further comprises information identifying a type of a hardware error; and
the plug-in module stores, in at least one section of the plurality of sections, error information that is available to the plug-in module but not available to the platform-specific error handler or the platform-independent error processing module.

17. A method for processing a hardware error received from a hardware component on the computer system, the method comprising:
at a platform-independent error processing module:
receiving notice of a hardware error from an error signal handler module that detects hardware errors from one or more hardware components;
generating an error record corresponding to the hardware error, wherein the error record comprises a record header and a plurality of sections, and wherein at least one first section of the error record includes platform-independent error information available to the platform-independent error processing module; and
requesting that a platform-specific error handler module augment the error record with additional error information that is available to the platform-specific error handler module but not available to the platform-independent error processing module, wherein the platform-specific error handler is configured to accept a plurality of plug-in modules that are capable of obtaining additional platform-specific error data and of performing additional platform-specific error handling functions;
at the platform-specific error handler:
performing platform-specific error handling functions at the direction of the platform-independent error processing module, wherein the platform-specific error handling functions comprise error recovery processing; and
augmenting at least one second section of the error record with platform-specific error information that is available to the platform-specific error handler module but not available to the platform-independent error processing module, wherein a section header of the at least one second section includes a flag indicating that the at least one second section includes platform-specific error information; and
at the plug-in module loaded by the platform-specific error handler:
performing additional error handling functions at the direction of the platform-specific error handler, wherein the additional error handling functions comprise additional error recovery processing; and
augmenting the error record with additional error information available to the plug-in module that is not available to the platform-specific error handler module or the platform-independent error processing module.

18. The method of claim 17 further comprising:
at the platform-independent error processing module, upon generating an error record corresponding to the hardware error based on error information available to the platform-independent error processing module:
determining whether the severity of the hardware error is such that the computer system should be shut down, and if so:
requesting that the platform-specific error handler module persist the error record in a persistent storage area associated with the computer system; and
shutting down the computer system.

* * * * *